US012613310B2

(12) United States Patent
Bichl et al.

(10) Patent No.: US 12,613,310 B2
(45) Date of Patent: Apr. 28, 2026

(54) INTEGRATED RADAR SIGNAL PROCESSING CIRCUIT

(71) Applicant: Infineon Technologies AG, Neubiberg (DE)

(72) Inventors: Markus Bichl, Feldkirchen-Westerham (DE); Mayeul Jeannin, Munich (DE)

(73) Assignee: Infineon Technologies AG, Neubiberg (DE)

( * ) Notice: Subject to any disclaimer, the term of this patent is extended or adjusted under 35 U.S.C. 154(b) by 645 days.

(21) Appl. No.: 17/948,262

(22) Filed: Sep. 20, 2022

(65) Prior Publication Data

US 2023/0096861 A1 Mar. 30, 2023

(30) Foreign Application Priority Data

Sep. 27, 2021 (DE) ..................... 10 2021 124 870.1

(51) Int. Cl.
  *G01S 7/35* (2006.01)
  *G01S 7/41* (2006.01)
  *G01S 13/58* (2006.01)
(52) U.S. Cl.
  CPC .............. *G01S 7/354* (2013.01); *G01S 7/415* (2013.01); *G01S 13/584* (2013.01)
(58) Field of Classification Search
  CPC ........ G01S 7/354; G01S 7/415; G01S 13/584; G01S 13/726; G01S 13/89; G01S 13/343; G01S 13/42; G01S 13/931; G01S 7/356
  See application file for complete search history.

(56) References Cited

U.S. PATENT DOCUMENTS

| | | | | |
|---|---|---|---|---|
| 10,055,383 B1 * | 8/2018 | Shafiee Ardestani | ....................... G11C 11/4093 | |
| 10,209,345 B2 | 2/2019 | Brett et al. | | |
| 2009/0254694 A1 * | 10/2009 | Ehrman | .............. G11C 7/1006 711/E12.001 | |
| 2009/0254697 A1 * | 10/2009 | Akerib | ................. G11C 7/1006 711/E12.001 | |
| 2016/0266238 A1 * | 9/2016 | Brett | ........................ G01S 13/42 | |
| 2018/0172813 A1 * | 6/2018 | Rao | ........................ G01S 13/343 | |

FOREIGN PATENT DOCUMENTS

WO     2015059514 A1     4/2015

* cited by examiner

*Primary Examiner* — William Kelleher
*Assistant Examiner* — Juliana Cross
(74) *Attorney, Agent, or Firm* — Eschweiler & Potashnik, LLC

(57) ABSTRACT

A circuit includes a signal processing unit to generate a radar map represented by an array with a first index and a second index, and a peak detection unit to identify potential targets in the radar map. Within the peak detection unit, a first peak detection sub-unit scans the radar map along the first index and stores a first detection bitmap that identifies peaks as a function of the first index, and a second peak detection sub-unit scans the radar map along the second index and outputs a second detection bitmap that identifies peaks as a function of the second index. The first detection bitmap and the second detection bitmap identify the peaks using a single bit. A hardware accelerator processes individual bits of the first detection bitmap and of the second detection bitmap.

20 Claims, 6 Drawing Sheets

INTEGRATED RADAR SIGNAL PROCESSING CIRCUIT

REFERENCE TO RELATED APPLICATIONS

This application claims priority to German Application 10 2021 124 870.1, filed on Sep. 27, 2021. The contents of the above-referenced Patent Application is hereby incorporated by reference in its entirety.

TECHNICAL FIELD

Exemplary embodiments relate in general to integrated radar signal processing circuits.

BACKGROUND

Results of a radar detection can be represented in the form of bitmaps. Each entry in such a bitmap is referenced by the values of two indices (e.g. the value of a distance index and the value of a Doppler index (or speed index)) and indicates whether a target was detected in the direction, distance represented by the values of the two indices or with the speed corresponding to the value of one of the two indices. For example, the first index is a distance index and the second index is a speed index, and the value of the bitmap indicates, for each combination of values for the distance index and the speed index, whether a target with the speed corresponding to the speed index value was detected at the distance corresponding to the distance index value. Other possible combinations are distance and direction as well as speed and direction. For further processing (e.g. direction determination, grouping of detected targets into objects etc.) it is typically necessary to process such bitmaps in a bitwise manner. Efficient approaches to such processing are desirable in order to determine results of the radar processing quickly, for example to be able to react quickly in order to avoid accidents when using a radar system in an autonomous vehicle.

SUMMARY

According to an embodiment, an integrated radar signal processing circuit is provided, which comprises: a signal processing unit configured to generate a radar map which is represented by an array with a first index and a second index, a peak detection unit, configured to identify potential targets in the radar map, wherein the peak detection unit has a first peak detection sub-unit which is configured to scan the radar map along the first index and store a first detection bitmap, which identifies peaks as a function of the first index, in a radar data memory and a second peak detection sub-unit which is configured to scan the radar map along the second index and output into the radar data memory a second detection bitmap which identifies peaks as a function of the second index, wherein the first detection bitmap and the second detection bitmap identify each of the peaks using a single bit, and a hardware accelerator which is connected to the radar data memory, wherein the hardware accelerator is a bit-oriented hardware accelerator that is configured to process individual bits of the first detection bitmap and of the second detection bitmap.

BRIEF DESCRIPTION OF THE DRAWINGS

The figures do not reflect the actual proportions, but are intended to illustrate the principles of the various exemplary embodiments. In the following text various exemplary embodiments are described with reference to the following figures.

DESCRIPTION

The following detailed description refers to the enclosed figures, which show details and exemplary embodiments. These exemplary embodiments are described in sufficient detail to enable the person skilled in the art to embody the invention. Other embodiments are also possible, and the exemplary embodiments can be modified in terms of their structural, logical and electrical aspects without deviating from the subject matter of the invention. The different exemplary embodiments are not necessarily mutually exclusive, but different embodiments can be combined to create new embodiments. For the purposes of this description, the terms "connected" and "coupled" are used to describe both a direct and an indirect connection, as well as a direct or indirect coupling.

Figure 1:
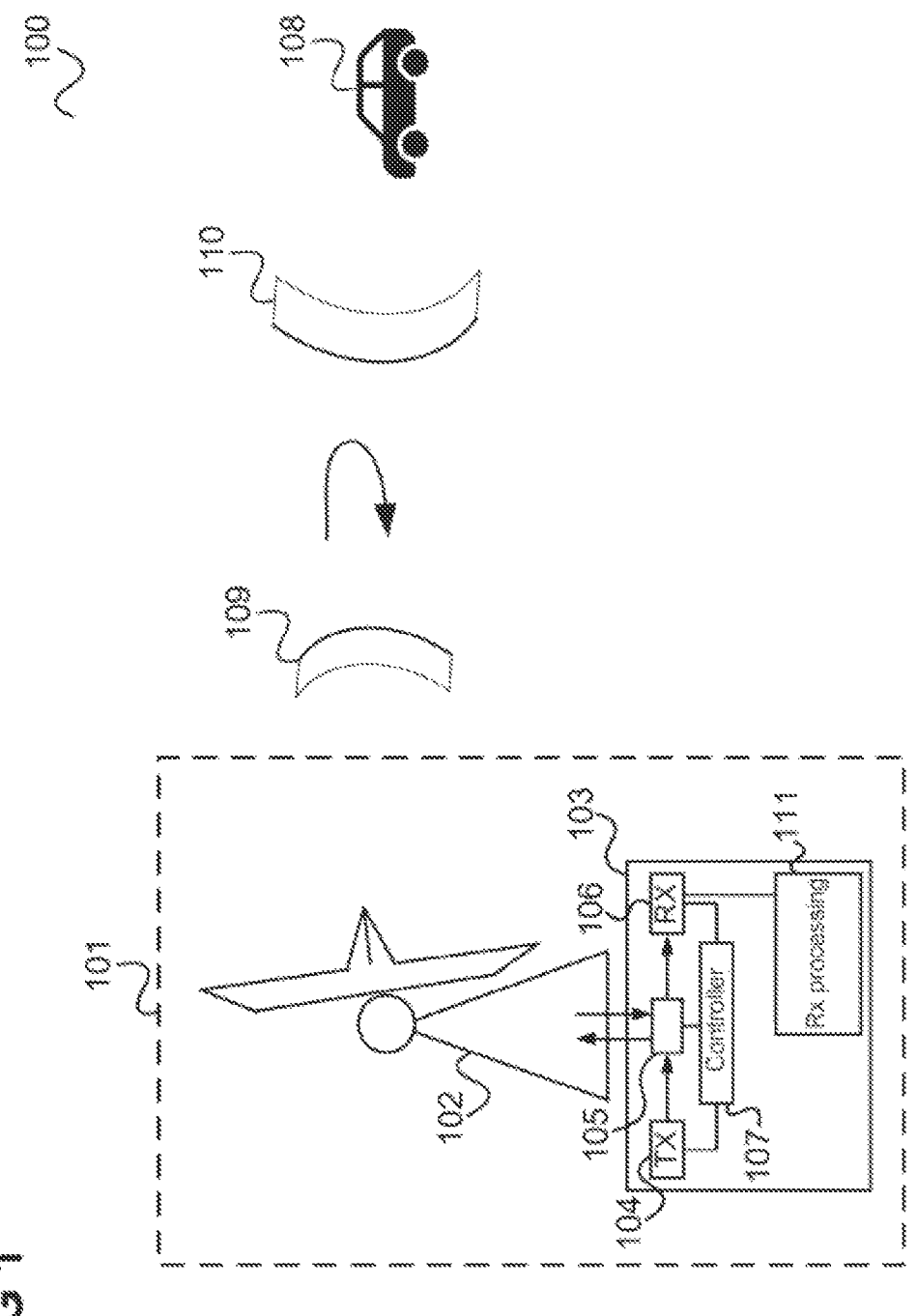
FIG. 1 shows a radar arrangement.

FIG. 1 shows a radar arrangement 100.

The radar arrangement 100 comprises a radar system 101 that contains an antenna arrangement 102 and a radar device 103. The radar device 103 comprises one or more (radar) transmitters 104, a duplexer 105 (e.g., a circuit for separating transmit and receive signals), a (radar) receiver 106 and a control device 107. The radar arrangement, although shown here as one dish, may contain a plurality of transmitting antennas in the form of a transmitting antenna array and a plurality of receiving antennas in the form of a receiving antenna array and may be arranged, for example, in a vehicle.

To detect an object 108, the control device 107 controls the one or more transmitters 104, the duplexer 105, and the receiver 106 as follows:

The one or more transmitters 104 send(s) a transmit signal 109 via the antenna arrangement 102.

The transmit signal 109 is reflected by a target; and

The radar system 101 receives the echo 110 of the transmit signal as a receive signal.

From the received signal, the radar device 103 (for example, an integrated radar signal processing circuit 111) calculates information about the position and speed of the object 108.

It should be noted that, whereas in the radar arrangement 100 of FIG. 1 the radar system 101 is shown as a (large) stationary system that detects a large object 108 such as the vehicle illustrated, a radar system 101 can also be mobile, smaller and can be used to detect smaller objects. For example, a radar device may be installed in a vehicle to detect nearby objects, in particular for autonomous driving.

The transmit signal 109 can contain a multiplicity of pulses. Pulse transmission includes the transmission of short bursts of high power in combination with times when the radar system 101 waits for echoes 110. This is typically not optimal for a highly dynamic situation as in a vehicle scenario.

Therefore, a continuous waveform can be used as the transmit signal instead. Since a continuous waveform only provides speed determination but does not provide distance information (due to the absence of a timestamp that could allow a distance calculation), one approach is frequency-modulated continuous wave radar (FMCW).

Figure 2:
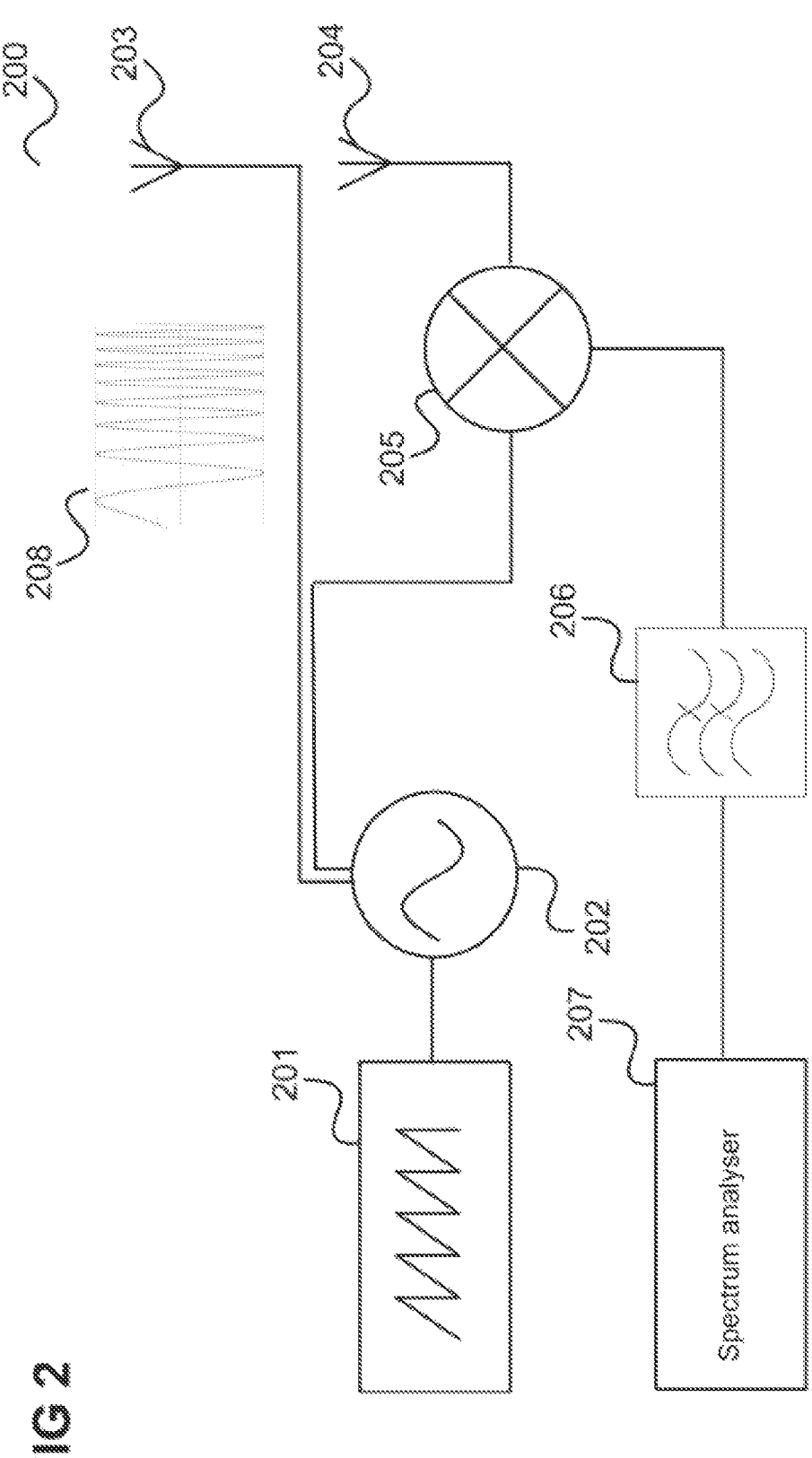
FIG. 2 shows an FMCW (Frequency Modulated Continuous Wave) radar system.

FIG. 2 shows an FMCW radar system 200.

In an FMCW radar system, the frequency of the transmit signal is not transmitted at a constant frequency, but is periodically ramped up and reset according to a sawtooth (or alternatively a triangle) waveform 201. The sawtooth waveform 201 modulates the frequency of an oscillator 202 and the resulting transmit signal is fed to a transmitting antenna 203.

A receiving antenna 204 receives the echo of the transmit signal (in addition to noise, etc.) as a receive signal. A mixer 205 mixes the transmit signal with the receive signal. The result of the mixture is filtered by a low pass filter 206 and processed by a spectrum analyser 207.

The transmit signal is in the form of a sequence of chirps resulting from the modulation of a sine wave with the sawtooth waveform 201. A single chirp 208 corresponds to the sine wave of the oscillator signal, which is frequency modulated by a "tooth" of the sawtooth waveform 201 from the minimum frequency to the maximum frequency.

The spectrum analyser 207 (e.g. implemented by the radar signal processing circuit 111) implements (at least) two Fast Fourier Transform (FFT) stages to extract distance information (by a first FFT stage) and speed information (by a second FFT stage) from the receive signal. The second FFT stage can also extract angle information, or else a third FFT stage may be provided to extract the angle information. In the present exemplary embodiment, in which a distance-Doppler map is generated, the second FFT stage extracts speed information. Note that the spectrum analyser 207 works with digital sample values, so that an A/D (analogue-to-digital) conversion is included in the path from the receiving antenna 204 to the spectrum analyser 207. For example, the filter 206 is an analog filter and an analogue-to-digital converter (ADC) is arranged between the filter 206 and the spectrum analyser 207.

In order to provide additional direction determination of the object 108 with respect to the radar system 101, the antenna arrangement 102 can comprise a plurality of receiving antennas, i.e. an array of receiving antennas. The direction of an object 108 can then be determined from phase differences with which the receiving antennas receive an echo 110 from an object. Accordingly, a radar receiver can include a mixer 205, an analogue filter 206, and an ADC for each receiving antenna.

The digitized receive signals for all receiving antennas are typically collected in a so-called data cube.

Figure 3:
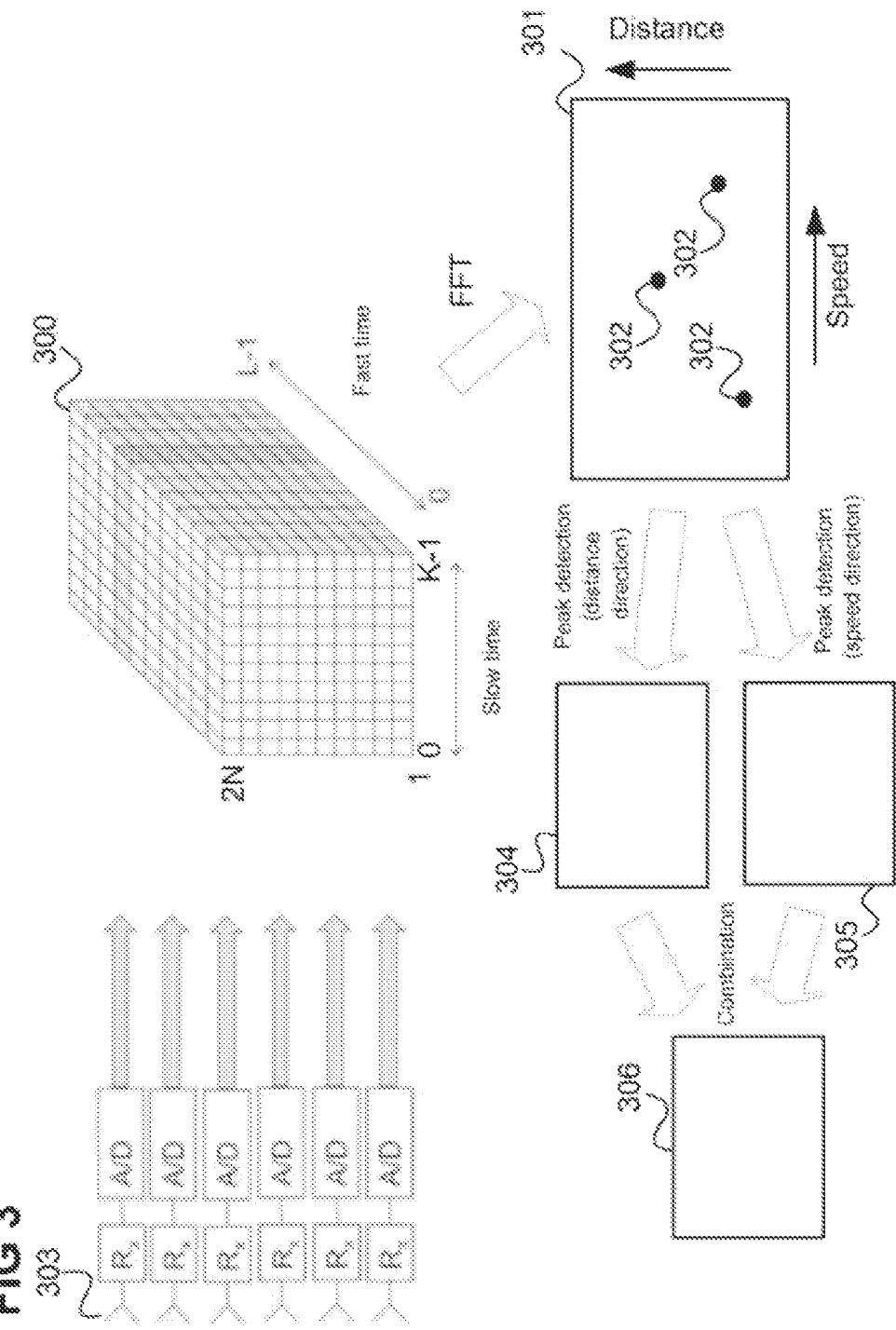
FIG. 3 shows the processing of a data cube.

FIG. 3 shows the processing of a data cube 300.

The data cube 300 contains digitized samples of the receive signals from M antennas, which form a receiving antenna array 303. The digital samples are generated by analogue-to-digital conversion.

For example, for each chirp (e.g. K=64 chirps), the received signal is sampled in such a way that it has L samples (e.g. L=512).

The L samples collected for each chirp are processed by the first FFT stage.

The processing of the first FFT stage is carried out for each chirp and each antenna, so that the result of processing the data cube 300 by the first FFT stage is again three-dimensional and can be the same size as the data cube 300, but now contains values for L distance bins instead of L sampling times. It should be noted that for real input signals of the first FFT stage, only the distance bins 0 to L/2 are generally useful, since the spectrum of the first FFT is mirrored at L/2 and the second half can be discarded.

The result of processing the data cube 300 by the first FFT stage is then processed by the second FFT stage along the chirps (for each antenna and for each distance bin).

The direction of the first stage FFT is called fast time, while the direction of the second stage FFT is called slow time (direction of the chirps).

The second stage FFT results in a distance-Doppler map for each antenna that, when aggregated over the antennas (for example, using NCI (non-coherent integration) or CI (coherent integration) to improve the signal-to-noise ratio and have a higher detection probability), gives rise to a distance-Doppler map 301. The distance-Doppler Map 301 contains an FFT output value for each combination of distance bin and Doppler bin, which is thus an array with a distance index and a Doppler index.

For a particular combination of distance bin and Doppler bin (that is, for specific distance/Doppler bins), the distance-Doppler map has 301 FFT peaks 302 (that is, peaks of the FFT baseline values (i.e. peak values of the absolute magnitude)).

To identify FFT peaks 302, a peak detection is applied to the distance-Doppler map 301, typically in both dimensions (distance and Doppler). This means that maxima in the column direction (here distance) and maxima in the row direction (here speed) are sought in the distance-Doppler map 301 (the rows and columns have FFT output values for the distance/Doppler bins) (considering the absolute magnitudes of the FFT output values).

The result is, for each dimension, a respective detection bitmap 304, 305, i.e. an array of bits that contains a 1 for each distance/Doppler bin (indexed by a value of the distance index and a value of the Doppler index) if a maximum was found during detection in the direction of the respective dimension, and zero otherwise. A 1 thus indicates a potential target.

The two detection bitmaps 304, 305 are then logically combined into a ("final" or "combined") detection bitmap 306 (e.g. multiplied, i.e. AND-combined, wherein other logic operations (OR, XOR, etc.) are also possible).

It should be noted that it is necessary that the data (i.e. the distance-Doppler map) is fully available before detection can be performed in the two dimensions (2D detection). The 2D detection (also known as 2D filtering) is also expensive in terms of space requirements and energy consumption. Nevertheless, it is typically desirable to perform the detection in the direction of both dimensions.

Post-processing also typically requires additional data to be extracted from the distance-Doppler map (for example, FFT points adjacent to a peak, such as smaller peaks).

The post-processing of the bitmaps 304, 305 or even the final bitmap 306 requires various operations which require a large amount of processing. In particular, it requires bitwise operations that are complex to perform using a CPU or a DSP (both of which the radar device 103 contains) and can therefore greatly increase the latency of the radar processing.

For example, the bitmaps 304 and 305 typically have different orientations. To be able to logically combine them into the final bitmap 306, one of the bitmaps 304, 305 must therefore be transposed.

Another example of complex bitwise processing is the extraction of indices of the final bitmap 306, i.e. the determination of the index value of the distance bin (i.e. the distance index value) and the index value of the Doppler (or speed value) bin (i.e. the Doppler index value) for each peak that the final bitmap 306 displays (by means of a respective 1). This is necessary in particular for radar post-processing operations such as grouping of peaks into objects (clustering), calculating the speed and distance of objects.

Accordingly, the extraction of the addresses of the FFT output values belonging to the peak in the physical memory (absolute system addresses) is also computationally intensive. The FFT output values are required, for example, for determining the direction of detected objects.

Further bitwise processing is required in DDM (Doppler Division Multiplexing) MIMO (Multiple Input Multiple Output) radar systems. In these systems, each peak occurs multiple times in the final bitmap 306, once per transmission channel with a fixed Doppler offset. The final bitmap 306 must therefore be rotated for each transmission channel (according to the respective Doppler offset) and the results are logically combined (multiplied) bitwise.

Figure 4:
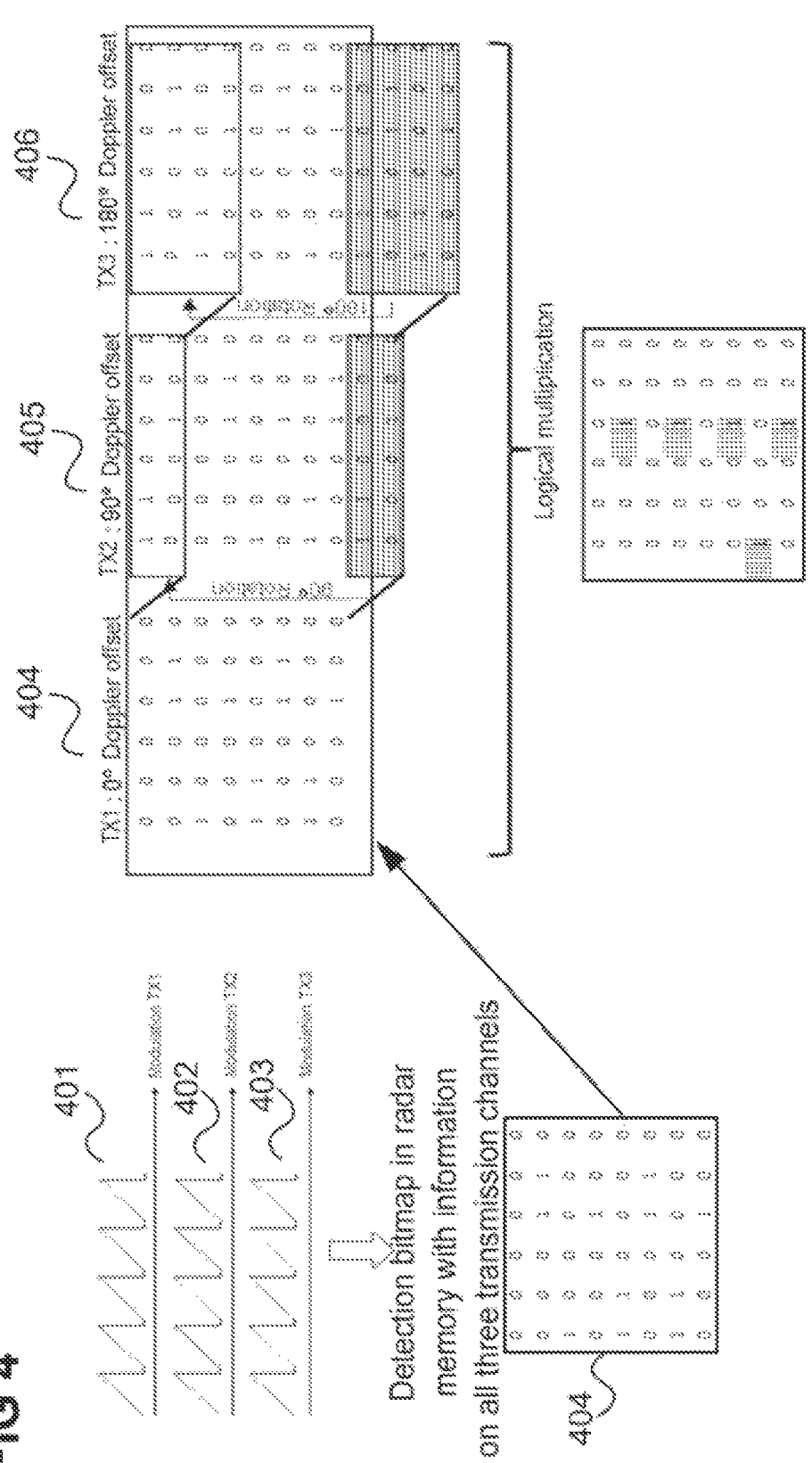
FIG. 4 shows an example of a radar detection with three transmission channels.

FIG. 4 shows an example with three transmission channels.

The transmission channels are implemented by the fact that sequential chirps for the transmission channels have different phase offsets (e.g. according to a BPSK (Binary Phase Shift Keying), QPSK (Quadrature PSK), or mPSK modulation).

In the example of FIG. 4, successive chirps 401 (shown here by spikes of a frequency modulation signal) of the first transmission channel (TX1) have no phase offset relative to each other, successive chirps 402 of the second transmission channel (TX2) have a phase offset of 90° to each other, and successive chirps 403 of the third transmission channel (TX3) have a phase offset of 180° to each other.

In this case, the final bitmap 404 contains information for all three transmission channels.

To combine this information, the final bitmap 404 is logically combined with rotated versions 405, 406 of itself.

In the example of FIG. 4, the rotated versions 405, 406 are generated by rotation of the rows (i.e. each row in the representation of FIG. 4 belongs to the same Doppler bin).

The above-mentioned bitwise operations (transposition of a bitmap, combination of bitmaps, in particular of rotated bitmaps for transmission demodulation, index-value and address extraction) can be performed by a CPU (or a DSP). For example, this extracts the bitmaps from a memory in which they are stored by a signal processing unit (SPU), which generates bitmaps as described above. The CPU (or DSP) runs the appropriate software for this purpose.

However, as mentioned above, performing the above-mentioned bitwise operations in software is very time-consuming.

For example, if a bitmap has 256 rows (for the Doppler bins) and 128 columns (for the distance bins) and the CPU processes 8-bit words, then 8 bits are combined into one word (for example, the 128 columns become 16 columns of 8-bit words). Three For-loops are then required to extract indexes (one loop over the distance index, one loop over the bit position within the 8-bit word, and one loop over the Doppler index), wherein the 8-bit word must be shifted and/or masked accordingly, depending on the bit position.

For a transposition, the CPU must extract each bit (e.g. by a shift and a logical AND for the masking) from a respective 8-bit value and write it to a new 8-bit value (e.g. by a shift and a logical OR for combining with the new 8-bit value).

In order to combine two bitmaps, the CPU must iterate over all (e.g. 256*16) 8-bit value positions, read out two 8-bit values at each position, logically combine them bitwise and write the resulting 8-bit value back to memory.

According to various embodiments, a hardware accelerator is provided for bitwise processing of (detection) bitmaps, i.e. for operations such as the operations described above. The hardware accelerator is configured to process bits of the bitmaps individually, i.e. is able to access individual bits (for processing) without accessing or needing to access adjacent bits in the respective bitmap. For example, it can process bits individually from a bit stream in which the bits are transferred to the bitmap for processing (e.g. from a memory). According to various embodiments the hardware accelerator is thus able to perform bitwise operations on bitmaps, such as the operations described above, efficiently.

The hardware accelerator can be closely coupled to an SPU that generates the bitmaps, but can also be operated as a standalone unit (e.g. read data from memory and store results there itself). For example, the hardware accelerator is arranged in the processing pipeline between the SPU and a CPU. For example, the hardware accelerator and the SPU are implemented by the integrated radar signal processing circuit 111. The hardware accelerator can store the results of its processing in a (radar data) memory (e.g. of the radar device 103) so that the CPU (of the radar device 103) can access the corresponding results for further processing (post-processing). For example, the CPU can access the FFT output values of the peaks and neighbouring values (in different dimensions) using the peak indices. In some cases, the SPU and CPU can generate the bitmaps by writing/reading full multibit words for each read/write operation to/from memory and/or to/from other modules in the system, wherein each multibit word used by the SPU and CPU has a multibit word length of $2^N$ bits (N>1). As an example, for a 64 bit processing system (N=6), each address of a memory device can correspond to a respective wordline of the memory array, and that wordline is coupled to 64 access transistors of 64 memory cells, respectively. Thus, when a given address is accessed by the SPU and/or CPU by accessing the wordline, the 64 bits for that word are accessed simultaneously, and are read from or written to the memory by the SPU and/or CPU. In contrast, while the SPU and CPU operate on the basis of words having the multibit word length, the hardware accelerator can write/read a single bit rather than a full word for each read/write operation, which helps more some radar processing operations more efficient. As an example, for the same 64 bit processing system described above, within the hardware accelerator each address within the hardware accelerator can correspond to a wordline that is coupled to only a single access transistor of a single memory cell. Thus, when a given address is accessed internal to the hardware accelerator, only a single bit (and not a full 64 bit word), is read/written by the accelerator. In some cases where the SPU, CPU and hardware accelerator each access the same memory, that memory can have a first set of wordlines to access full words of the memory, and a second set of wordlines (and/or switches along the first set of wordlines) to access individual bits of the memory.

Direct memory access (DMA) to the results in memory may also be provided.

Figure 5:
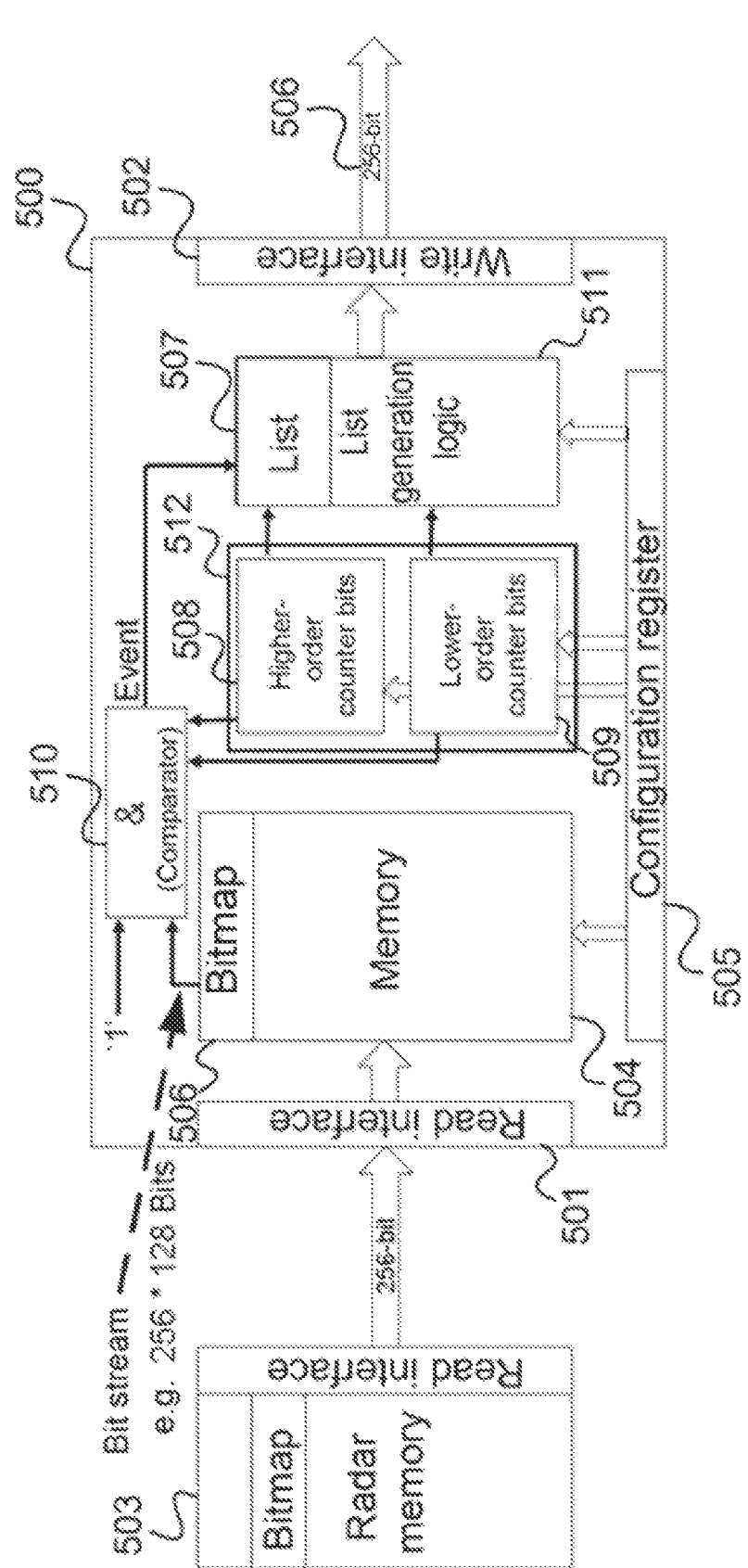
FIG. 5 shows a hardware accelerator for processing bitmaps according to one embodiment.

FIG. 5 shows a hardware accelerator 500 according to one embodiment.

The hardware accelerator 500 has an input interface (read interface) 501 that reads bitmaps to be processed from a radar data memory 503 and an output interface (write interface) 502 that writes processing results into the radar data memory 503 or into another memory.

For example, the input interface 501 has a high bit width, allowing the hardware accelerator 500 to read bitmaps into an internal bitmap memory 504 at high speed. For example, the input interface 501 is 256 bits wide and thus enables the reading of 128-bit*256-bit bitmaps column-by-column. For example, the bitmap memory 504 is implemented by an SRAM (Static Random Access Memory) or register. The hardware accelerator 500 also contains one or more configuration registers 505 that can be used to control or adjust the processing that it performs (for example, by the CPU).

The following text describes the structure and principle of operation of the hardware accelerator 500 for extracting the indices of peaks, i.e. for generating a list 507 which specifies, for each 1 in a bitmap 506 stored in the bitmap memory 504, the distance index value and the Doppler index value of the 1 (and thus the position of the 1 in the bitmap 506).

According to one embodiment, for this operation the hardware accelerator 500 contains a hardware counter 512, a comparison logic circuit (i.e. a hardware comparator logic) 510, and a list generation logic circuit 511.

The bitmap is fed into a bit stream of the comparison logic circuit 510. In this example, this is done by columns (i.e. in the direction of the Doppler bins) and in each clock cycle of a hardware accelerator clock, one bit is fed to the comparison logic circuit 510.

The hardware counter 512 counts from zero up to the number of Doppler bins (#Doppler) times the number of distance bins (#Distance). These can be set via the configuration register 505 and the hardware counter 512 counts in increments of 1, wherein its counter value is incremented in each clock cycle. It starts counting when the entire bitmap 506 has been loaded. After #Doppler*#Distance, it jumps back to 0.

In each clock cycle, the comparison logic circuit 511 compares the bit value just supplied to it with 1. If the bit value equals 1, it outputs a "True" event to the list generation circuit 511. In response to a "True" event, the list generation circuit 511 reads out the current counter value of the hardware counter 512 and writes the higher-order bits 508 (as a distance index) and the lower-order bits 509 (as a Doppler index) to the list 507 as an index-value pair.

This means that the list generation circuit 511 determines the Doppler index from the lower-order counter value bits (e.g. the seven lower-order bits (bits 0 to 6) if #Doppler=128) and the distance index from the higher-order counter-value bits (e.g. the eight higher-order bits (bits 7 to 14) if #Distance=256).

If the length of the part of the list that it generated is equal to the width of the output interface 502, it triggers the output of the part of the list via the output interface (i.e., it outputs the list in 256-bit chunks, for example).

Thus, the hardware accelerator 500 determines the list 507 using two for-loops (each being realized by the higher-order bits or lower-order bits of the hardware counter 512) and works directly on the internal memory 506. The bit values of the bitmap 506 are read out in the distance direction and Doppler direction.

The hardware accelerator 500 can thus perform the entire list generation at once (i.e. triggered by a software command, i.e. by activation by the CPU). From the point of view of the CPU therefore, only one command is required.

Similarly, the other bitwise operations can be implemented by a hardware accelerator, for which additional hardware accelerators can be provided, or a hardware accelerator that supports multiple bitwise operations is provided.

For the bitwise combination, an internal bitmap memory 504 is provided for both bitmaps and the comparator (AND operation with 1) is replaced by an AND operation between two bits of the two bitmaps that belong to the same distance index value and the same Doppler index value. Instead of the list 507, a resulting bitmap is generated that contains the results of the AND operations (again in each case at the position given by the respective distance index value and the respective Doppler index value). One of the bitmaps can also be transposed, either by transposition before the two bitmaps are combined, or during the combine operation, by reading one of the bitmaps by column and one of the bitmaps by row from the memory 504 (one of the bitmaps is then located in the memory 504 as a 128*256-bit array, for example).

The comparator is not needed for the transposition and instead of the list 507 a resulting bitmap is generated which contains every bit from the bitmap 506, but the position is reversed according to the transposition (i.e. the Doppler index value of the bit in the resulting bitmap is the distance index value of the bit in the input bitmap and vice versa).

In embodiments of the invention the memory 504 is arranged to directly deliver bits, not words. Each address in the memory may address a single bit, so that single bits may be delivered without the need to extract an appropriate bit from a word read from the address in the memory. A bit stream along the direction of any axis in the data cube may thus be provided by appropriately incrementing the address to scan along the appropriate direction. The memory may in hardware only have a single bit at each address. Alternatively, the memory may be arranged more conventionally in bytes or words but with appropriate hardware to select out the required bit when reading out data along any axial direction of the three dimensional data cube without requiring additional processing. The memory 504 may thus be able to deliver as am output the bitstream illustrated in FIG. 5 from bitmap 506 without needing to route the memory output to a core or hardware module to remove extraneous bits.

Figure 6:
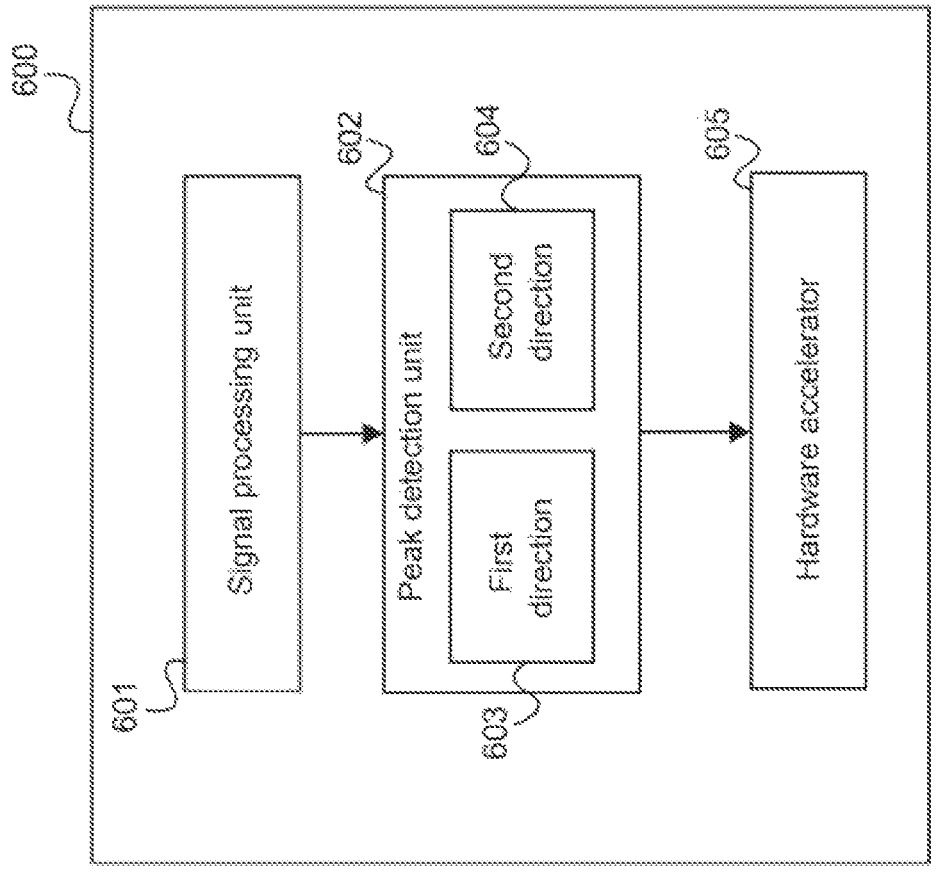
FIG. 6 shows an integrated radar processing circuit according to one embodiment.

In summary, according to various embodiments an integrated radar signal processing circuit as shown in FIG. 6 is provided.

FIG. 6 shows an integrated radar signal processing circuit 600 according to one embodiment.

The integrated radar signal processing circuit 600 comprises a signal processing unit 601, which is configured to generate a radar map represented by an array with a first index and a second index.

The integrated radar signal processing circuit 600 also has a peak detection unit 602, which is configured to identify potential targets in the radar map.

The peak detection unit 602 has a first peak detection sub-unit 603, which is configured to scan the radar map along the first index and store in a radar data memory a first detection bitmap, which identifies peaks as a function of the first index.

In addition, the peak detection unit 602 has a second peak detection sub-unit 604, which is configured to scan the radar map along the second index and store in a radar data memory a second detection bitmap, which identifies peaks as a function of the second index.

The first detection bitmap and the second detection bitmap identify each of the peaks using a single bit.

In addition, the integrated radar signal processing circuit 600 comprises a hardware accelerator 605 which is connected to the radar data memory 503, wherein the hardware accelerator 605 is a bit-oriented hardware accelerator that is configured to process individual bits of the first detection bitmap and of the second detection bitmap.

The approach of FIG. 6 allows a reduced energy consumption compared to a software-based implementation of bitwise operations (as described above, for example) by a CPU or DSP due to the reduced number of memory accesses, a reduced latency due to the acceleration by dedicated hardware, and a reduction in the load on the CPU or DSP so that they can take on other tasks.

This makes it possible in particular to use radar in scenarios where results of radar processing must be provided reliably at high speed, such as in an autonomous vehicle, where it is very important for safety to be able to detect objects quickly.

In the following text, various exemplary embodiments are specified.

Exemplary embodiment 1 is an integrated radar signal processing device as described with reference to FIG. 6.

Exemplary embodiment 2 is an integrated radar signal processing circuit according to exemplary embodiment 1, wherein the hardware accelerator is configured to transpose the first detection bitmap and/or the second detection bitmap.

Exemplary embodiment 3 is an integrated radar signal processing circuit according to exemplary embodiment 1 or 2, wherein the hardware accelerator is configured to combine the first detection bitmap and the second detection bitmap into a combined detection bitmap.

Exemplary embodiment 4 is an integrated radar signal processing circuit according to exemplary embodiment 3, wherein the combining of the first detection bitmap with the second detection bitmap comprises the multiplication of each bit of the first detection bitmap with a respective bit of the second detection bitmap, so that the combined detection bitmap identifies peaks that are identified by both the first detection bitmap and the second detection bitmap.

Exemplary embodiment 5 is an integrated radar signal processing circuit according to exemplary embodiment 3 or 4, wherein the hardware accelerator is configured to transpose the first detection bitmap for the combination, so that during the combination, each bit of the first detection bitmap is combined with the bit of the second detection bitmap that has the value of the first index of the bit of the first detection bitmap as the value of the second index and has the value of the second index of the bit of the first detection bitmap as the value of the first index.

Exemplary embodiment 6 is an integrated radar signal processing circuit according to one of the exemplary embodiments 3 to 5, wherein the hardware accelerator is configured to determine the value of the first index and the value of the second index of peaks identified by the combined detection bitmap.

Exemplary embodiment 7 is an integrated radar signal processing circuit according to exemplary embodiment 6, wherein the hardware accelerator is configured to generate and output a list of values of the first index and of associated values of the second index of the peaks identified by the combined detection bitmap.

Exemplary embodiment 8 is an integrated radar signal processing circuit according to one of the exemplary embodiments 3 to 7, wherein the hardware accelerator comprises: a storage element used to store the combined bitmap; a hardware counter for counting bits; and a comparator logic used to receive the bit identified by the hardware counter and to output a corresponding event if the bit identifies a peak.

Exemplary embodiment 9 is an integrated radar signal processing circuit according to exemplary embodiment 8, wherein the comparator logic is configured to output the event to a list generation circuit of the hardware accelerator, which is configured to output a first value given by higher-order bits of the hardware counter and a second value given by lower-order bits of the hardware counter, as an index-value pair of a peak.

Exemplary embodiment 10 is an integrated radar signal processing circuit according to one of the exemplary embodiments 1 to 9, wherein the radar data memory is an internal memory of the integrated radar signal processing circuit.

Exemplary embodiment 11 is an integrated radar signal processing circuit according to one of the exemplary embodiments 1 to 10, wherein the hardware accelerator has an internal bitmap memory which is configured to store the first detection bitmap, the second detection bitmap and/or a combination of the first detection bitmap with the second detection bitmap and is configured to output the stored bitmap as a bit stream to a processing logic circuit of the hardware accelerator which is configured to process the bits of the bit stream individually.

Exemplary embodiment 12 is an integrated radar signal processing circuit according to exemplary embodiment 11, wherein the processing logic circuit is configured to compare each bit of the bit stream with a fixed value or to combine each bit with a respective bit of a bit stream of another bitmap.

Exemplary embodiment 13 is an integrated radar signal processing circuit according to exemplary embodiment 11 or 12, wherein the hardware accelerator is configured to read the first detection bitmap, the second detection bitmap and/or the combination of the first detection bitmap with the second detection bitmap into the internal bitmap memory completely and then subject them to bitwise processing.

Example 14 is an integrated radar signal processing circuit according to one of the exemplary embodiments 11 to 13, wherein the hardware accelerator has a read interface that is configured to read the first detection bitmap, the second detection bitmap and/or the combination of the first detection bitmap with the second detection bitmap from the radar data memory into the internal bitmap memory, wherein the read interface is configured to read in rows or columns of the first detection bitmap, of the second detection bitmap and/or of the combination of the first detection bitmap with the second detection bitmap in parallel.

Example 15 is an integrated radar signal processing circuit according to one of the exemplary embodiments 1 to 14, wherein the first index is a distance index and the second index is a Doppler index, wherein the first index is a distance index and the second index is a direction index or wherein the first index is a speed index and the second index is a direction index.

Although the invention has mainly been shown and described by reference to specific embodiments, it should be understood by those familiar with the technical field that numerous changes can be made with regard to its design and details without departing from the nature and scope of the invention, as defined by the following claims. The scope of the invention is therefore defined by the attached claims and it is intended that any changes that fall within the literal meaning or equivalent scope of the claims are included.

What is claimed is:

1. An integrated radar signal processing circuit, comprising:

a signal processing unit configured to generate a radar map which is represented by an array with a first index and a second index;

a peak detection unit, configured to identify potential targets in the radar map, wherein the peak detection unit comprises:

a first peak detection sub-unit configured to scan the radar map along the first index and store in a radar data memory a first detection bitmap that identifies peaks as a function of the first index, and a second peak detection sub-unit configured to scan the radar map along the second index and output into the radar data memory a second detection bitmap that identifies peaks as a function of the second index, wherein the first detection bitmap and the second detection bitmap identify each of the peaks using a single bit value; and a hardware accelerator connected to the radar data memory, wherein the hardware accelerator is configured to, for each bit of the first detection bitmap and the second detection bitmap, increment a counter;

in response to the bit indicating a peak, determine a corresponding index value pair based on the counter value; and add the determined index value pair to a list of index value pairs corresponding to respective peaks identified in the bitmap.

2. The integrated radar signal processing circuit according to claim 1, wherein the hardware accelerator is configured to transpose the first detection bitmap and/or the second detection bitmap.

3. The integrated radar signal processing circuit according to claim 1, wherein the radar data memory is an internal memory of the integrated radar signal processing circuit.

4. The integrated radar signal processing circuit according to claim 1, wherein the hardware accelerator comprises:

a storage element used to store the bitmap; and a comparator logic used to compare the bit with a single bit value that indicates no peak and to output a corresponding event in response to the bit comprising the single bit value indicating a peak.

5. The integrated radar signal processing circuit according to claim 1, wherein the hardware accelerator is configured to output a first value given by higher-order bits of the counter and a second value given by lower-order bits of the counter as the index value pair of a peak.

6. An integrated radar signal processing circuit, comprising:

a signal processing unit configured to generate a radar map represented by an array with a first index and a second index;

a peak detection unit, configured to identify potential targets in the radar map, wherein the peak detection unit comprises:

a first peak detection sub-unit configured to scan the radar map along the first index and store in a radar data memory a first detection bitmap that identifies peaks as a function of the first index, and a second peak detection sub-unit configured to scan the radar map along the second index and output into the radar data memory a second detection bitmap that identifies peaks as a function of the second index, wherein the first detection bitmap and the second detection bitmap identify each of the peaks using a single bit; and a hardware accelerator connected to the radar data memory, wherein the hardware accelerator is configured to combine individual bits of the first detection bitmap and the second detection bitmap to generate a combined detection bitmap.

7. The integrated radar signal processing circuit according to claim 6, wherein the combining of the first detection bitmap with the second detection bitmap comprises multiplication of each bit of the first detection bitmap with a respective bit of the second detection bitmap, so that the combined detection bitmap identifies peaks that are identified by both the first detection bitmap and the second detection bitmap.

8. The integrated radar signal processing circuit according to claim 6, wherein the hardware accelerator is configured to transpose the first detection bitmap for the combination, so that during the combination each bit of the first detection bitmap is combined with a bit of the second detection bitmap that has the value of the first index of the bit of the first detection bitmap as the value of the second index, and has the value of the second index of the bit of the first detection bitmap as the value of the first index.

9. The integrated radar signal processing circuit according to claim 6, wherein the hardware accelerator is configured to determine a value of the first index and a value of the second index of peaks identified by the combined detection bitmap.

10. The integrated radar signal processing circuit according to claim 9, wherein the hardware accelerator is configured to generate and output a list of values of the first index and of associated values of the second index of the peaks identified by the combined detection bitmap.

11. The integrated radar signal processing circuit according to claim 6, wherein the hardware accelerator comprises:

a storage element used to store the combined detection bitmap;

a hardware counter for counting bits; and a comparator logic used to receive the bit identified by the hardware counter and to output a corresponding event if the bit identifies a peak.

12. The integrated radar signal processing circuit according to claim 11, wherein the comparator logic is configured to output the event to a list generation circuit of the hardware accelerator configured to output a first value given by higher-order bits of the hardware counter and a second value given by lower-order bits of the hardware counter, as an index-value pair of a peak.

13. The integrated radar signal processing circuit according to claim 6, wherein the hardware accelerator has an internal bitmap memory configured to store the first detection bitmap, the second detection bitmap, or the combination of the first detection bitmap with the second detection bitmap and is configured to output the stored bitmap as a bit stream to a processing logic circuit of the hardware accelerator configured to process the bits of the bit stream individually.

14. The integrated radar signal processing circuit according to claim 13, wherein the processing logic circuit is configured to compare each bit of the bit stream with a fixed value or to combine each bit with a respective bit of a bit stream of another bitmap.

15. The integrated radar signal processing circuit according to claim 13, wherein the hardware accelerator is configured to read the first detection bitmap, the second detection bitmap and/or the combination of the first detection bitmap with the second detection bitmap into the internal bitmap memory completely and then subject them to bitwise processing.

16. The integrated radar signal processing circuit according to claim 13, wherein the hardware accelerator has a read interface configured to read, in parallel, rows or columns of the first detection bitmap, the second detection bitmap and/or the combination of the first detection bitmap with the second detection bitmap.

17. The integrated radar signal processing circuit according to claim 16, wherein the first index is a distance index and the second index is a Doppler index, wherein the first index is a distance index and the second index is a direction index, or wherein the first index is a speed index and the second index is a direction index.

18. A method, comprising:

generating a radar map which is represented by an array with a first index and a second index;

identifying potential targets in the radar map by scanning the radar map along the first index and storing in a radar data memory a first detection bitmap that identifies peaks as a function of the first index, and scanning the radar map along the second index and outputting into the radar data memory a second detection bitmap that identifies peaks as a function of the second index, wherein the first detection bitmap and the second detection bitmap identify each of the peaks using a single bit value; and for each bit of the first detection bitmap and the second detection bitmap, incrementing a counter;

in response to the bit indicating a peak, determining a corresponding index value pair based on the counter value; and adding the determined index value pair to a list of index value pairs corresponding to respective peaks identified in the bitmap.

19. The method of claim 18, comprising outputting a corresponding event in response to the bit indicating a peak.

20. The method of claim 18, comprising outputting a first value given by higher-order bits of the counter and a second value given by lower-order bits of the counter as the index value pair of a peak.

\* \* \* \* \*